US008098757B2

United States Patent
Bi et al.

(10) Patent No.: US 8,098,757 B2
(45) Date of Patent: Jan. 17, 2012

(54) METHOD AND APPARATUS FOR WINDOWING ORTHOGONAL FREQUENCY DIVISION MULTIPLEXED SIGNALS

(75) Inventors: Qi Bi, Morris Plains, NJ (US); Sinan Gezici, Princeton, NJ (US); Lei Song, Edison, NJ (US); Yifei Yuan, Livingston, NJ (US)

(73) Assignee: Alcatel Lucent, Paris (FR)

( * ) Notice: Subject to any disclaimer, the term of this patent is extended or adjusted under 35 U.S.C. 154(b) by 1781 days.

(21) Appl. No.: 11/255,803

(22) Filed: Oct. 21, 2005

(65) Prior Publication Data
US 2007/0092025 A1    Apr. 26, 2007

(51) Int. Cl.
H04L 27/10    (2006.01)
(52) U.S. Cl. ......... 375/284; 375/144; 375/233; 375/278
(58) Field of Classification Search .................. 375/284, 375/285, 260, 261, 298, 299, 301
See application file for complete search history.

(56) References Cited

U.S. PATENT DOCUMENTS

| | | | | |
|---|---|---|---|---|
| 6,269,132 B1 * | 7/2001 | Yonge, III | ..................... | 375/346 |
| 7,072,411 B1 * | 7/2006 | Dollard | ........................ | 375/260 |
| 7,197,453 B2 * | 3/2007 | Mansour | ...................... | 704/203 |
| 7,720,175 B2 * | 5/2010 | Yeon et al. | ..................... | 375/297 |
| 7,792,321 B2 * | 9/2010 | Palmadesso et al. | ......... | 382/100 |
| 2001/0004357 A1 * | 6/2001 | Fuke et al. | ..................... | 370/335 |
| 2002/0136288 A1 * | 9/2002 | McCarty, Jr. | ................. | 375/232 |
| 2002/0181610 A1 * | 12/2002 | Sumasu et al. | ................ | 375/296 |
| 2003/0185326 A1 * | 10/2003 | Kolze | ............................ | 375/371 |
| 2006/0008017 A1 * | 1/2006 | Balakrishnan et al. | ....... | 375/260 |

OTHER PUBLICATIONS

Mourelo, Jose Tellado, "Paek to Average Power Reduction for Multicarrier Modulation", Electrical Engineering, Stanford University, Sep. 1999.*
Putnam, William et al; "Design of Fraction Delay Filters Using Convex Optimization", IEEE, Oct. 19-22, 1997, Center for Research, Stanford University, CA.*
Mahmoud, Imbaby I., "Linear and Quadratic Objective Function Effects on Force Directed Method Based Analog Placement", IEEE; Radio Science Conference, Mar. 19-21, 1996.*
Sigl, G., et al, "Analytical Placement: A Linear or a Quadratic Function", 28$^{th}$ ACM/IEEE Design Automation; 1991, p. 427-432.*

* cited by examiner

*Primary Examiner* — Khanh C Tran
*Assistant Examiner* — Qutbuddin Ghulamali
(74) *Attorney, Agent, or Firm* — Williams, Morgan & Amerson, P.C.

(57) ABSTRACT

The present invention provides a method of windowing signals in a communication system. The method includes accessing at least one first signal associated with at least one of a plurality of orthogonal frequencies and applying a window function to the at least one first signal to form at least one second signal. The at least one second signal remains substantially orthogonal to signals associated with the plurality of orthogonal frequencies.

16 Claims, 2 Drawing Sheets

METHOD AND APPARATUS FOR WINDOWING ORTHOGONAL FREQUENCY DIVISION MULTIPLEXED SIGNALS

BACKGROUND OF THE INVENTION

1. Field of the Invention

This invention relates generally to communication systems, and, more particularly, to wireless communication systems.

2. Description of the Related Art

Conventional communication systems transmit information between entities using modulated electromagnetic signals. For example, conventional wireless communication systems include one or more base stations, which may also be referred to as node-Bs or access points or access networks, for providing wireless connectivity to one or more mobile unit, which may also be referred to using terms such as user equipment, subscriber equipment, and access terminals. Modulated signals including data and/or control information may be transmitted between mobile units and base stations over one or more communication channels, which may be formed according to a number of different communication protocols. Exemplary communication protocols include Time Division Multiple Access (TDMA), Code Division Multiple Access (CDMA, CDMA2000), and Frequency Division Multiple Access (FDMA). Similar techniques may also be used to transmit modulated signals over wired connections according to protocols such as Digital Subscriber Line (DSL) protocols.

One particular type of FDMA protocol is referred to as Orthogonal Frequency Division Multiplexing (OFDM). An OFDM communication channel may be formed using a baseband signal that includes a number of orthogonal sub-carriers or sub-channels or tones. Signals transmitted on each sub-carrier may be independently modulated using a modulation technique such as quadrature amplitude modulation (QAM) or phase-shift keying (PSK). The composite baseband signal is typically used to modulate a main radio frequency carrier or channel. OFDM may be implemented using efficient fast Fourier transform (FFT) algorithms and the robustness of OFDM communication channels against inter-symbol interference (ISI) makes OFDM a suitable technique for high-data rate systems. Accordingly, OFDM may be used to establish communication channels for a variety of applications, such as wireless local area networks, digital audio/video broadcasting, asymmetric digital subscriber lines (ADSLs), systems based on the IEEE 802.16 WiMAX standard, and the like.

Transitions between different symbols transmitted over an OFDM communication channel typically occur over relatively short time scales. Consequently, the power spectrum of the signals transmitted over the OFDM communication channels may be relatively broad. The relatively slow decay rate of the average power spectral density may result in significant out-of-band energy transmission. The out-of-band energy may reduce the efficiency of the transmitting device and may also cause interference with other devices transmitting in adjacent frequency bands. In a practical OFDM system, such devices that operate according to the IEEE 802.16 WiMAX standard, the out-of-band power should be restricted below a certain level in order not to cause significant interference to other devices in the adjacent frequency bands.

The out-of-band emission may be reduced by filtering the transmitted signal. However, conventional filters for out-of-band emission suppression are complex to implement and may result in significant distortion of the transmitted signal that may reduce or eliminate the orthogonality of the signals. Consequently, the receiver may need to perform additional operations to compensate for the signal distortion introduced by conventional out-of-band emission suppression filters. Alternatively, modulation coding may be used to introduce special correlation into OFDM data symbols in order to shape the spectrum and reduce the effects of inter-carrier interference (ICI). Modulation coding schemes may also be referred to as "self-cancellation" schemes. Self-cancellation techniques may, however, undesirably affect radio resource management when implemented in actual systems. For example, self-cancellation schemes may degrade scheduler performance or may increase the complexity of the algorithms used to schedule different tones to maintain or improve throughput.

Multiplying each OFDM sample in the time domain by a window tap, or windowing, is another common way to shape the spectrum of OFDM signal. Compared to conventional filters and/or self-cancellation schemes for reducing out-of-band emission, windowing is relatively simple to implement at the transmitter. However, windowing typically reduces the orthogonality of the windowed OFDM signals. Accordingly, conventional receivers may have to be modified to compensate for the reduction in the orthogonality of the windowed OFDM signals. For example, the receiver may be required to perform one or more matrix inversions to extract the transmitted signal. The receiver modifications may increase the complexity of the receiver which may increase the cost of the receiver. A raised-cosine window may also be employed for windowing OFDM signals. However, the raised-cosine window is just a common selection and does not guarantee the optimality of the design. Consequently, the overhead associated with the raised-cosine windowing technique may be large, which may reduce the efficiency of the communication system.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for windowing signals in a communication system. The method includes accessing at least one first signal associated with at least one of a plurality of orthogonal frequencies and applying a window function to the at least one first signal to form at least one second signal. The at least one second signal remains substantially orthogonal to signals associated with the plurality of orthogonal frequencies.

BRIEF DESCRIPTION OF THE DRAWINGS

The invention may be understood by reference to the following description taken in conjunction with the accompanying drawings, in which like reference numerals identify like elements, and in which.

Figure 1:
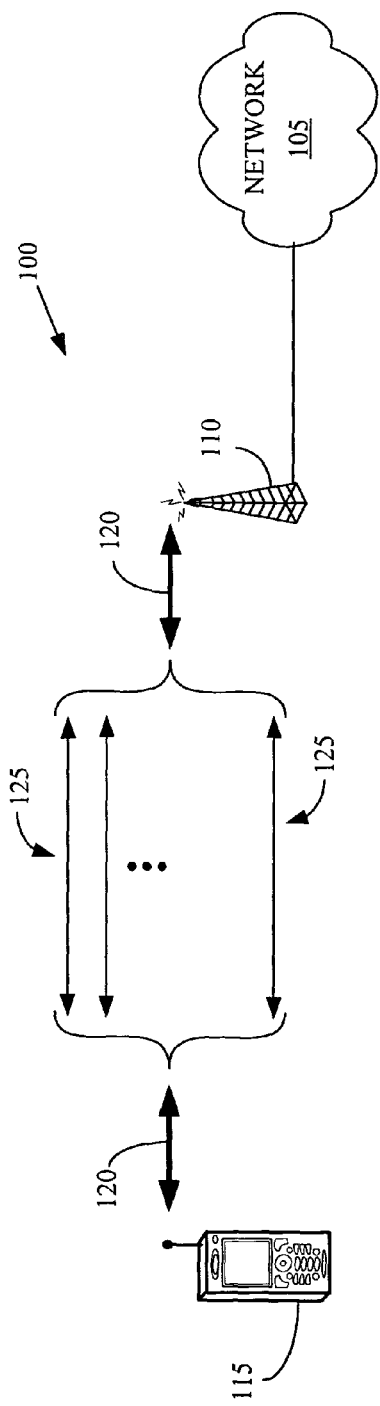
FIG. 1 shows one exemplary embodiment of a communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to FIG. 1, one exemplary embodiment of a communication system 100 is shown. In the illustrated embodiment, the communication system 100 includes a wireless network 105 that is communicatively coupled to a base station 110. However, persons of ordinary skill in the art having benefit of the present disclosure should appreciate that the wireless network 105 may be coupled to any number of base stations 110. Although the present invention will be discussed below in the context of the wireless network 105, persons of ordinary skill in the art having benefit of the present disclosure should also appreciate the present invention is not limited to the wireless network 105. In alternative embodiments, the network 105 may be any desirable wired network, wireless network or combination thereof. For example, the network 105 may be an Asynchronous Digital Subscriber Line (ADSL) network that allows a modem to communicate with a DSL server over uplink and/or downlink channels of the DSL network.

The wireless network 105 and the base station 110 provide wireless connectivity according to one or more wireless communication protocols. In the illustrated embodiment, the base station 110 provides wireless connectivity according to an IEEE 802.16 (e.g., a WiMAX protocol). However, persons of ordinary skill in the art having benefit of the present disclosure should appreciate that the present invention is not limited to these exemplary wireless communication systems. In alternative embodiments any desirable wireless communication system may be used to provide wireless connectivity. Exemplary wireless communication systems include a Universal Mobile Telecommunication Systems (UMTS), a Global System for Mobile communications (GSM), a Code Division Multiple Access (CDMA or CDMA 2000) system, an Evolution, Data Only (EVDO) system, an IEEE 802.11 (e.g., a Wireless Fidelity or WiFi) system, an IEEE 802.20 system, a Bluetooth system, and the like. Furthermore, the wireless network 105 and/or the base station 110 may, in alternative embodiments, include wired connections that operate according to one or more wired communication protocols.

The communication system 100 includes one or more mobile units 115. Exemplary mobile units 115 include, but are not limited to, mobile phones, personal data assistants, smart phones, text messaging devices, laptop computers, desktop computers, and the like. In the interest of clarity, only one mobile unit 115 is shown in FIG. 1. However, persons of ordinary skill in the art having benefit of the present disclosure should appreciate that the communication system 100 may include any desirable number of mobile units 115. The mobile unit 115 may form a wireless communication link or channel 120 with the wireless network 105. In the illustrated embodiment, the wireless communication channel 120 includes a plurality of subcarriers 125 associated with orthogonal frequencies. For example, the subcarriers 125 may be implemented according to an orthogonal frequency division multiplexing (OFDM) scheme. However, the present invention is not limited to OFDM protocols. In alternative embodiments, the subcarrier frequencies may be defined by any protocol as long as the subcarrier frequencies are substantially orthogonal. Persons of ordinary skill in the art should appreciate that, in the present context, the term "substantially orthogonal" is used to indicate that actual signals transmitted over the communication channel 120 may not be perfectly or ideally orthogonal to each other, but may be sufficiently orthogonal to be used in the communication system 100 in the manner discussed herein.

Symbols may be transmitted over the communication channel 120 by the base station 110 and/or the mobile units 115. As discussed above, transitions between successive symbols results in spreading of the power spectral density, which may lead to out-of-band emission, i.e. energy that is transmitted outside of the frequency band devoted to the communication channel 120 and/or the sub-channels 125. In one embodiment, discussed in detail below, the base station 110 and/or the mobile unit 115 may determine a window function that may be applied to transmitted symbols to reduce the out-of-band emission. For example, the base station 110 and/or the mobile unit 115 may determine the window function using a convex optimization over possible window functions, with the constraint that the window function does not require modification of the receiver (e.g., the portions of the base station 110 and/or mobile unit 115 used to receive signals). In one embodiment, the solution to the convex optimization may yield a maximum out-of-band emission suppression for a given extended guard interval (EGI). In one embodiment, the convex optimization may also be constrained such that the overlapping parts of the window add up to unity.

Figure 2:
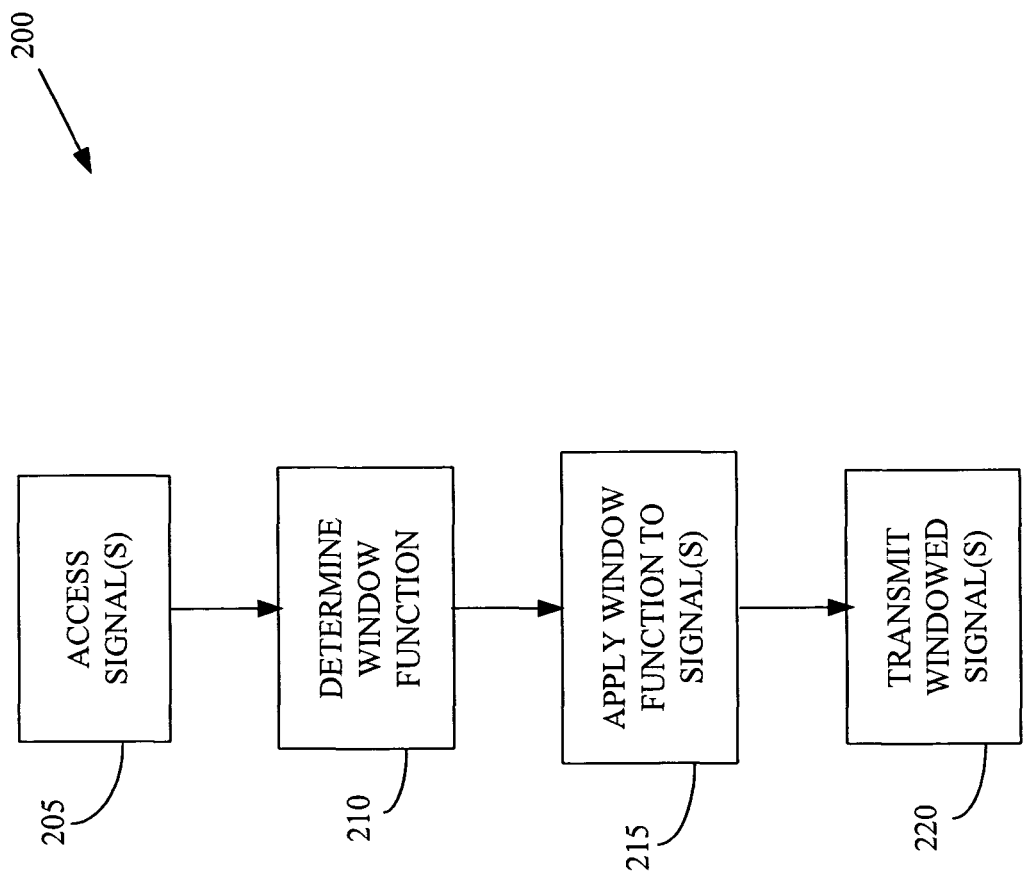
FIG. 2 conceptually illustrates one exemplary embodiment of a method of applying a window function to a signal, in accordance with the present invention.

FIG. 2 conceptually illustrates one exemplary embodiment of a method 200 of applying a window function to a signal. In various alternative embodiments, the method 200 may be implemented in software or hardware or in any combination thereof. For example, the method 200 may be encoded in one or more software modules or may be implemented in one or more application-specific integrated circuits (ASICs). In the illustrated embodiment, one or more signals are accessed (at 205). The one or more signals may be accessed (at 205) by a device, such as the base stations 110 and/or the mobile units 115 shown in FIG. 1, which will be used to transmit the signals over a communication channel including one or more orthogonal subchannels, such as the communication channel 120 and the subchannels 125 shown in FIG. 1. In the illustrated embodiment, the signals, $s_n$, are formed according to an OFDM signal model:

$$s(t) = \sum_{n=-\infty}^{\infty} s_n(t),$$

where $s_n(t)$ denotes the signal part related to the nth OFDM symbol, as given by the following expression:

$$s_n(t) = \frac{1}{\sqrt{M}} \sum_{k=0}^{M-1} \tilde{s}_{k,n} e^{j2\pi k(t-nT_s)/T} g(t - nT_s),$$

where M is the number of sub-carriers, $\tilde{s}_{k,n}$ is the complex information data for the kth sub-carrier of the nth OFDM symbol, and g(t) is a window function with a support of $[-T_g-T_{cp}, T+T_g]$. The time variables $T_{cp}$, $T_g$, and T denote the cyclic-prefix (CP) interval, the extended guard interval (EGI), and the useful OFDM symbol interval, respectively. The total OFDM symbol duration is $T_s=T+T_{cp}+T_g$.

Figure 3:
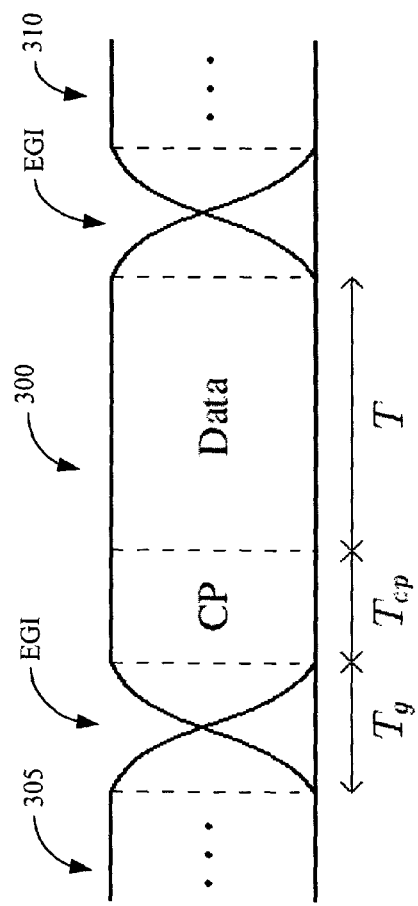
FIG. 3 conceptually illustrates one exemplary embodiment of a window, in accordance with the present invention.

FIG. 3 conceptually illustrates one exemplary embodiment of a window function 300. In the illustrated embodiment, information or data indicative of a symbol is transmitted during the symbol interval indicated by variable T and the cyclic-prefix (CP) is transmitted during the the cyclic-prefix (CP) interval. The window 300 has a duration that is longer than the symbol period $T_s=T+T_{cp}+T_g$ and so the extended guard intervals, $T_g$, of the symbol 300 overlap with the extended guard intervals of the adjacent symbols 305, 310. Since the guard intervals are discarded at the receiver, the overlapping sections do not typically cause any problem for detection purposes.

Referring back to FIG. 2, a window function may be determined (at 210) to reduce the out-of-band emission. One exemplary embodiment of a technique for determining (at 210) the window function will now be described. In the interest of clarity, a number of assumptions will be made in the discussion of the exemplary embodiment. However, persons of ordinary skill in the art should appreciate that this exemplary embodiment, and the corresponding assumptions, are not intended to limit the present invention. Furthermore, persons of ordinary skill in the art having benefit of the present disclosure will be able to generalize the exemplary embodiment to situations in which these assumptions may or may not apply.

In the exemplary embodiment, the data symbols are assumed to be independent for different OFDM symbols and/or different carriers, and have zero mean. The data symbols are also assumed to be identically distributed for different OFDM symbols so that:

$$\frac{1}{2} E\{\tilde{s}_{k_1,n_1} \tilde{s}^*_{k_2,n_2}\} = \begin{cases} A^2_{k_1}, & k_1 = k_2 \ \& \ n_1 = n_2 \\ 0, & \text{otherwise} \end{cases}$$

Then, the average power spectral density (PSD) of s(t) can be represented as:

$$\Phi_{ss}(f) = \frac{1}{MT_s} \sum_{k=0}^{M-1} A^2_k |G(f - k/T)|^2,$$

where G(f) is the Fourier transform of the window function g(t). In the exemplary embodiment, the modulation schemes for the sub-carriers satisfy $A^2_k = A^2$ for all k, e.g. the modulations have the same average power, and the average PSD expression reduces to $$\Phi_{ss}(f) = \frac{A^2}{MT_s} \sum_{k=0}^{M-1} |G(f - k/T)|^2.$$

The above expression for the PSD indicates that the spectrum of the signal can be shaped by determining (at 210) an appropriate window function g(t).

In the exemplary embodiment, the window function is a discrete-time window $g=[g_1 \ldots g_N]$, which may be obtained from g(t) by sampling at a rate of M/T samples per second, where $N_g$ indicates the number of samples from the EGI part of the window from each side of the symbol. However, persons of ordinary skill in the art having benefit of the present disclosure should appreciate that other window functions, such as continuous time window functions and/or interpolated window functions, may be used. The window function may then be determined (at 210) to minimize the out-of-band energy while other portions of the window function, e.g. the CP portion and/or the data portion, remain substantially rectangular or square. For example, the above expression for the PSD indicates that the stop-band energy of the OFDM symbol due to the kth sub-carrier is proportional to $$\varepsilon_k = \frac{1}{2\pi} \int_{w_k}^{2\pi - w_k} |G(e^{jw})|^2 dw,$$

where $w_k$ is the stop-band frequency related to the kth sub-carrier. After some manipulation, the out-of-band energy due to the kth sub-carrier can be expressed as $$\varepsilon_k = g^T Q_k g,$$

where $Q_k$ is given by $$[Q_k]_{mn} = \begin{cases} 1 - \frac{w_k}{\pi}, & m = n \\ -\frac{\sin|(m-n)w_k|}{\pi(m-n)}, & m \neq n \end{cases}$$

for m,n=1, . . . , N. Then, the total out-of-band energy is proportional to $$\sum_{k=0}^{M-1} g^T Q_k g.$$

A matrix Q may be defined as:

$$Q = \sum_{k=0}^{M-1} Q_k$$

so that the out-of-band energy minimization can be expressed as minimizing the quadratic term $g^T Q g$ under constraints.

In the exemplary embodiment, the quadratic term $g^T Q g$ may be minimized under the constraint that the window function is symmetric. For example, the quadratic term $g^T Q g$ may be minimized subject to $g_i = g_{N-i+1}$ for i=1,N. In one embodiment, the quadratic term may be minimized under the constraint that the window function is substantially rectangular or flat. For example, the quadratic term $g^T Q g$ may be minimized subject to $g_i = 1$ for $i = N_g + 1, N - N_g$. The constraint that the window function be substantially rectangle or or flat may allow a conventional OFDM receiver to receive signals that have been modified using this window function, since the main symbol part is kept the same. These two sets of constraints can be expressed as a simple linear constraint as follows:

minimize $g^T Q g$ subject to $Ag = b$ where $A = [A_1^T A_{2\ T}]^T$ is an $(N-N_g) \times N$ matrix, with the ith column of $A_1^T$ being given by $e_i - e_{N-i+i}$ for i=1, . . . , $N_g$, and the jth column of $A_2^T$ being given by $e_{Ng+j}$ for j=1, . . . , N $-2N_g$, and $b = [0^T_{Ng} 1^T_{N-2Ng}]^T$. Note that, in the exemplary embodiment, $e_i$ denotes an N×1 unit vector that has zeros for all elements except the ith one, which is equal to unity.

The minimization problem defined in the exemplary embodiment has a quadratic objective function and a linear constraint, and is therefore a convex optimization problem. Accordingly, the window function may be determined (at 210) using a closed-form solution that may be obtained by using the Lagrange duality after some manipulation:

$$g^* = Q^{-1} A^T (AQ^{-1} A^T)^{-1} b$$

Note that while the optimization problem in the exemplary embodiment is designed for minimizing the emission power after a stop-band frequency, the same approach can be applied to minimize the power in other selected frequency bands as well.

The amplitude of the sum of the overlapping portions of adjacent windows, i.e. in the EGI regions shown in FIG. 3, may not be the same for the window function determined (at 210) as discussed above. In some cases, this may result in an increase in the peak-to-average-power ratio (PAPR). In one embodiment, the window function may be determined (at 210) to achieve a reduced out-of-band emission level while maintaining substantially the same peak-to-average-power ratio (PAPR). For example, the following constraint may be added to the optimization problem discussed above for the exemplary embodiment:

$$g_i + g_{Ng-i+2} = 1$$

for i=1, . . . , $N_2$, where $N_2$ = floor($N_g + 1/2$).

Since this is a linear constraint, it can be added to the linear matrix constraint in the minimization problem of the exemplary embodiment. For example, if $A_2$ denotes an $N_2 \times N$ matrix, whose ith row is given by $e^T_i + e^T_{Ng-i+1}$, and $b_2$ denotes an $N_2 \times 1$ vector of ones, the linear constraint in discussed above may be modified to read:

$$\begin{bmatrix} A \\ A_2 \end{bmatrix} g = \begin{bmatrix} b \\ b_2 \end{bmatrix}$$

The window function may be applied (at 215) to one or more signals. For example, one or more signals containing information indicative of one or more symbols may be modulated (at 215) by the window function in a device such as the base station 110 and/or the mobile unit 115 shown in FIG. 1. The modulated signals may then be transmitted (at 220) over a communication channel. For example, the modulated signals may be transmitted (at 220) over one or more sub-channels 125 of the communication channel 120 shown in FIG. 1. However, the present invention is not limited to signals that are modulated by the window function. In alternative embodiments, the signals may also be modulated by other functions, such as channel codes and the like.

Embodiments of the present invention may be used to optimize the PSD for a particular OFDM signal such that the transmitted signals remain substantially orthogonal. Consequently, a conventional OFDM receiver structure may be used to receive the transmitted signal. The techniques described above may therefore be implemented by modifying the transmitter side, without necessarily changing the receiver side. This may reduce the receiver complexity (relative to the conventional techniques for reducing out-of-band emission described above), at least in part because the receiver is not required to perform additional matrix inversions. Embodiments of the present invention may also provides a reduced, or in some cases a minimum, amplitude of out-of-band energy radiation for a given amount of redundancy (i.e., for a given EGI length) under the constraint that only the EGI parts of the window may be modified (to facilitate the use of conventional OFDM receivers). Also, for a given out-of-band energy level, embodiments of the present invention may reduce redundancy among the window functions that are used to adjust the EGI part of the OFDM symbol. The techniques described above may be easy to implement, relative to conventional solutions, since they may only use a single multiplication at the time instants corresponding to EGI parts of the symbols.

The overhead associated with transmitting symbols may also be reduced. For example, the overhead associated with modulating OFDM signals using a conventional raised-cosine window function is approximately 7.8% for a fast Fourier transform (FFT) that uses 128 sub-channels. In contrast, the overhead associated with modulating OFDM symbols using the window functions described above is approximately 5.5% for a fast Fourier transform (FFT) that uses 128 sub-channels. For another example, the overhead associated with modulating OFDM signals using a conventional raised-cosine window function is approximately 9% for an FFT that uses 256 sub-channels. In contrast, the overhead associated with modulating OFDM symbols using the window functions described above is approximately 7% for an FFT that uses 256 sub-channels.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
    generating, in a transmitter, a window function that minimizes an out-of-band energy by minimizing a quadratic objective function of out-of-band energies of subcarriers at a plurality of orthogonal frequencies subject to a linear constraint that the window function is a substantially flat window function within at least one of a cyclic prefix portion or a data portion of the window function;
    accessing, in the transmitter, at least one first signal associated with at least one of the plurality of orthogonal frequencies; and
    applying, in the transmitter, the window function to said at least one first signal to form at least one second signal, the at least one second signal being substantially orthogonal to the plurality of orthogonal frequencies.

2. The method of claim 1, wherein accessing said at least one first signal comprises accessing information indicative of at least one symbol.

3. The method of claim 1, wherein generating the window function comprises generating the window function by minimizing the quadratic objective function of out-of-band energies of subcarriers at the plurality of orthogonal frequencies subject to the linear constraint that the window function is a substantially symmetric window function.

4. The method of claim 1, wherein generating the window function comprises generating a window function by minimizing the quadratic objective function of out-of-band energies of subcarriers at the plurality of orthogonal frequencies subject to the linear constraint of maintaining a peak-to-average-power ratio associated with said at least one first signal.

5. The method of claim 1, wherein applying the window function comprises applying at least one of a discrete-time window function, a continuous time window function, and an interpolated window function.

6. The method of claim 5, wherein applying the discrete-time window function comprises applying the discrete-time window function over a time period selected based upon at least one of an extended guard interval, a cyclic-prefix interval, and a symbol interval.

7. The method of claim 1, comprising transmitting said at least one second signal via a communication channel.

8. The method of claim 7, wherein transmitting said at least one second signal via the communication channel comprises transmitting said at least one second signal via at least one sub-channel associated with at least one of the plurality of orthogonal frequencies.

9. A method, comprising:
    receiving, at a receiver, at least one first signal comprising a plurality of orthogonal frequencies, said at least one first signal being formed by applying a window function to at least one second signal, the window function being formed to minimize an out-of-band energy by minimizing a quadratic objective function of out-of-band energies of subcarriers at the plurality of orthogonal frequencies subject to a linear constraint that the window function is a substantially flat window function within at least one of a cyclic prefix portion or a data portion of the window function, and wherein said at least one first signal is substantially orthogonal to the plurality of orthogonal frequencies.

10. The method of claim 9, wherein receiving said at least one first signal comprises receiving information indicative of at least one symbol.

11. The method of claim 9, wherein said at least one first signal is formed by applying a substantially symmetric window function to said at least one second signal.

12. The method of claim 9, wherein said at least one first signal is formed by applying a substantially flat window function to said at least one second signal.

13. The method of claim 9, wherein said at least one first signal is formed by applying a window function that is constrained to maintain a peak-to-average-power ratio associated with said at least one second signal.

14. The method of claim 9, wherein said at least one first signal is formed by applying at least one of a discrete-time window function, a continuous time window function, and an interpolated window function.

15. The method of claim 14, wherein said at least one first signal is formed by applying the discrete-time window function over a time period selected based upon at least one of an extended guard interval, a cyclic-prefix interval, and a symbol interval.

16. The method of claim 9, wherein receiving said at least one second signal over the communication channel comprises receiving said at least one second signal via at least one sub-channel associated with at least one of the plurality of orthogonal frequencies.

\* \* \* \* \*